US010884707B1

United States Patent
Li et al.

(10) Patent No.: US 10,884,707 B1
(45) Date of Patent: Jan. 5, 2021

(54) TRANSPOSE OPERATIONS USING PROCESSING ELEMENT ARRAY

(71) Applicant: Amazon Technologies, Inc., Seattle, WA (US)

(72) Inventors: Haichen Li, Campbell, CA (US); Ron Diamant, Santa Clara, CA (US); Jeffrey T. Huynh, San Jose, CA (US); Yu Zhou, Pflugerville, TX (US); Se jong Oh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/455,201

(22) Filed: Jun. 27, 2019

(51) Int. Cl.
| | | |
|---|---|---|
| G06F 7/78 | (2006.01) |
| G06F 7/523 | (2006.01) |
| G06F 7/50 | (2006.01) |
| G06N 3/063 | (2006.01) |
| G06F 9/38 | (2018.01) |
| G06F 9/50 | (2006.01) |
| G06F 8/41 | (2018.01) |

(52) U.S. Cl.
CPC ............... *G06F 7/78* (2013.01); *G06F 7/50* (2013.01); *G06F 7/523* (2013.01); *G06F 8/41* (2013.01); *G06F 9/3836* (2013.01); *G06F 9/5027* (2013.01); *G06N 3/063* (2013.01)

(58) Field of Classification Search
None
See application file for complete search history.

(56) References Cited

U.S. PATENT DOCUMENTS

| | | | | |
|---|---|---|---|---|
| 4,760,543 A * | 7/1988 | Ligtenberg | ............ | G06F 17/147 708/400 |
| 5,321,639 A * | 6/1994 | Krishnamoorthy | .. | G06N 3/0675 708/7 |
| 6,167,502 A * | 12/2000 | Pechanek | ............ | G06F 15/8023 712/15 |
| 7,596,678 B2 * | 9/2009 | Beaumont | ........... | G06F 9/30032 708/520 |
| 8,327,114 B1 * | 12/2012 | Cismas | ............... | G06F 11/2051 712/16 |

(Continued)

OTHER PUBLICATIONS

Johnson,J.R. etal., A methodology or designing, modifying and implementing Fourier Transform Algorithms on Various Architectures, Circuits for Signal Process. vol. 9, No. 4., pp. 449-500. (Year: 1990).*

(Continued)

*Primary Examiner* — Eric Coleman
(74) *Attorney, Agent, or Firm* — Kilpatrick Townsend & Stockton LLP

(57) ABSTRACT

Provided are systems and methods for transposing a tensor using processing element array operations. In some cases, it may be necessary to transpose elements of a tensor to perform a matrix operation. The tensor may be decomposed into blocks of data elements having dimensions consistent with the dimensions of a systolic array. An identity multiplication may be performed on each block of data elements loaded into a systolic array and the multiplication products summed in column partitions of a results buffer. The data elements in the column partitions of results buffer can then be mapped to row partitions of a buffer memory for further processing.

20 Claims, 8 Drawing Sheets

(56) References Cited

U.S. PATENT DOCUMENTS

| | | | | |
|---|---|---|---|---|
| 10,489,479 | B1* | 11/2019 | Shalev | G06F 17/12 |
| 2010/0211337 | A1* | 8/2010 | Clark | G01V 3/087 |
| | | | | 702/57 |
| 2011/0161625 | A1* | 6/2011 | Pechanek | G06F 9/30043 |
| | | | | 712/11 |
| 2015/0169369 | A1* | 6/2015 | Baskaran | G06F 9/4881 |
| | | | | 718/102 |
| 2016/0020824 | A1* | 1/2016 | Ulrich | G06F 17/10 |
| | | | | 375/340 |
| 2017/0168991 | A1* | 6/2017 | Baskaran | G06F 17/16 |
| 2017/0200094 | A1* | 7/2017 | Bruestle | G06N 20/00 |
| 2018/0260690 | A1 | 9/2018 | Young et al. | |
| 2019/0205787 | A1* | 7/2019 | Duriseti | G06F 17/16 |

OTHER PUBLICATIONS

Lin, Jui-Cheih etal., Bit Matrix Transpose with Tensor Product and Perfect Shuffling, 2013 IEEE workshop on Signal Processing Systems. IEEE, pp. 389-394. (Year: 2013).*

Zekri, A. S., Restructuring and Implementations of 2D Matrix Transpose Algorithm using SSE Vector Instructions, IEEE, 7 pages. (Year: 2015).*

O.Leary, Diane, Systolic Arrays for Matrix Transpose and Other Reorderings, IEEE. pp. 117-122. (Year: 1987).*

Application No. PCT/US2020/039670, International Search Report and Written Opinion, dated Oct. 12, 2020, 13 pages.

Srivastava et al., "T2S-Tensor: Productively Generating High-Performance Spatial Hardware for Dense Tensor Computations", 2019 IEEE 27TH Annual International Symposium on Field-Programmable Custom Computing Machines (FCCM), Apr. 28, 2019, pp. 181-189.

* cited by examiner

US 10,884,707 B1

TRANSPOSE OPERATIONS USING PROCESSING ELEMENT ARRAY

BACKGROUND

An accelerator is an integrated circuit device optimized for performing computations (e.g., neural network computations), that may otherwise be performed by a general purpose processor. Data stored in a main memory of a computing system is copied, or mapped, into memory locations within the accelerator to enable faster access to the data for performing calculations by execution engines of the accelerator. In some cases, based on the calculations to be performed by execution engines, the architecture of the accelerator can be leveraged to improve calculation speeds.

BRIEF DESCRIPTION OF THE DRAWINGS

Various embodiments in accordance with the present disclosure will be described with reference to the drawings, in which.

DETAILED DESCRIPTION

Figure 1:
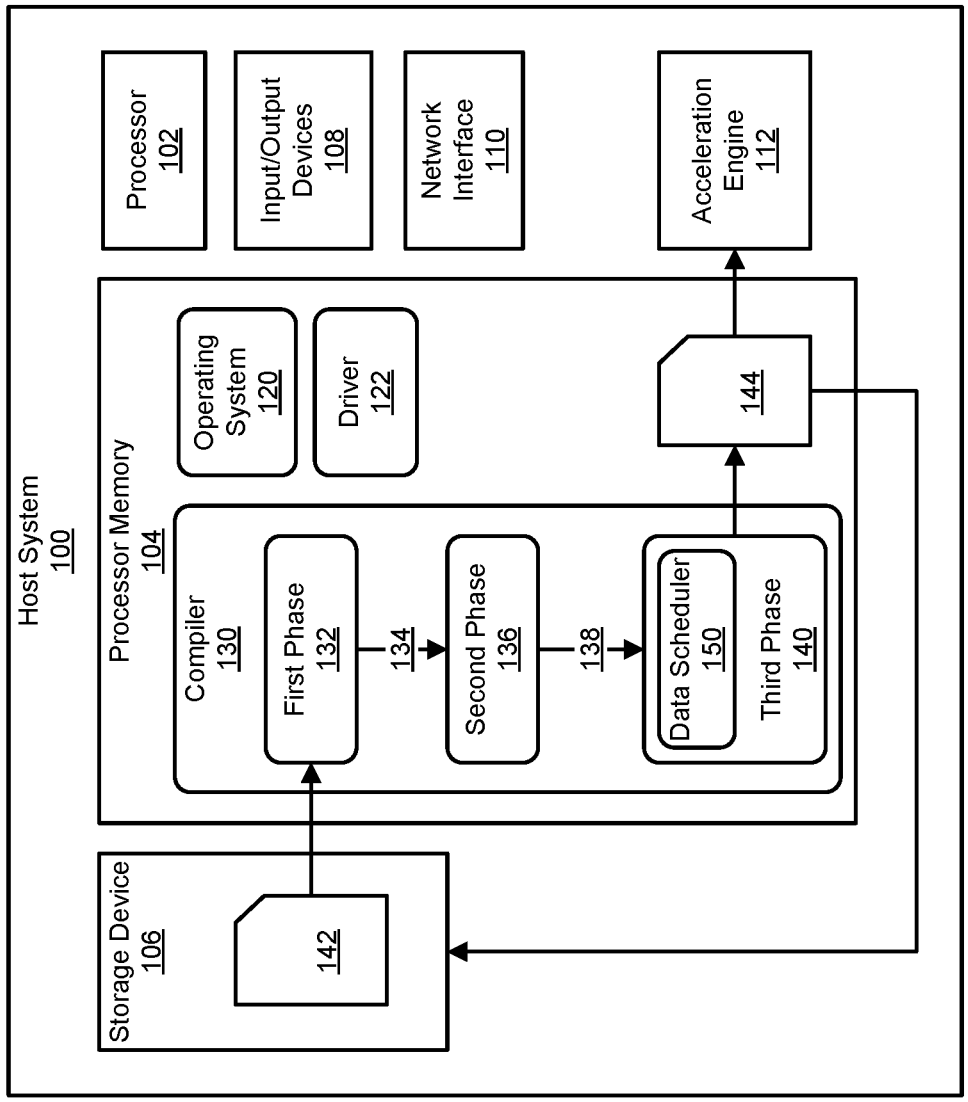
FIG. 1 is a block diagram illustrating an example of a host system on which a compiler can execute according to aspects of the present disclosure.

An acceleration engine can include one or more accelerators to execute computations using a processing engine array. The processing engine array can perform complex computations such as matrix multiply computations or other computations. The accelerator may also include a memory subsystem. The memory subsystem may include one or more buffer memories that stores data, for example, neural network weights and data to be processed by the processing engine array, as well as intermediate and/or final results of computations performed by the processing engine array.

For various processing engine array computations, data in the form of a tensor may be retrieved from host memory (e.g., dynamic random access memory (DRAM)) and stored in the buffer memory. In practical applications, the number of data elements in a tensor can be much greater than the number of data elements that the buffer memory can store at one time and/or that a processing engine array is capable of processing at one time. Thus, the tensor may be decomposed into multiple blocks of data elements of appropriate size to be stored in the buffer memory. Further, the number of data elements of the decomposed tensor stored in the buffer memory may be too large for the processing engine array to process at one time. Therefore, the block of data elements stored in the buffer memory may be again decomposed to enable processing by the processing engine array.

In some cases, it may be necessary to change the way the tensor is mapped to the buffer memory. For example, in the case of a matrix multiplication on weights and inputs of different sizes, a matrix transpose may be needed for the computation. One way to perform a matrix transpose operation is to copy the matrix data from the buffer memory into a host memory (e.g., DRAM), and then write the matrix data from the host memory back into the buffer memory at the transposed locations. However, such a technique can incur significant external memory access delays, and may require host processor intervention that takes up host processor cycles. To reduce the latency when the processing engine array performs computations such as a matrix transpose operation, internal processing engine array operations can be used to perform the matrix transpose operation without requiring the matrix data to be written to and read from the host memory.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Aspects of the present disclosure provide systems and methods to perform matrix transpose on data elements stored in a buffer memory of an accelerator using systolic array operations. Compiler-generated instructions may decompose a multi-dimensional tensor of data elements into a set of two-dimensional (2D) matrices having dimensions not exceeding the dimensions of the systolic array. Multiply-accumulate systolic array operations may be performed on each of the set of 2D matrices using an identity matrix. Additional instructions generated by the compiler may cause the results of the identity multiplication to be stored in the buffer memory as a transpose of each of the 2D matrices.

FIG. 1 is a block diagram illustrating an example of a host system 100 on which a compiler 130, such as is described herein, can execute according to aspects of the present disclosure. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device. Peripheral devices are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that can be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touch-screen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of locale storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various steps before producing the instructions that are to be executed by the acceleration engine 112. These steps can include, for example, removing redundant dependencies, resolving or handling dependencies between nodes by inserting synchronization instructions into the code, identifying possible optimizations in memory usage or memory bandwidth usage, and other operations. In some examples, the third stage 140 can include a data scheduler 150.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
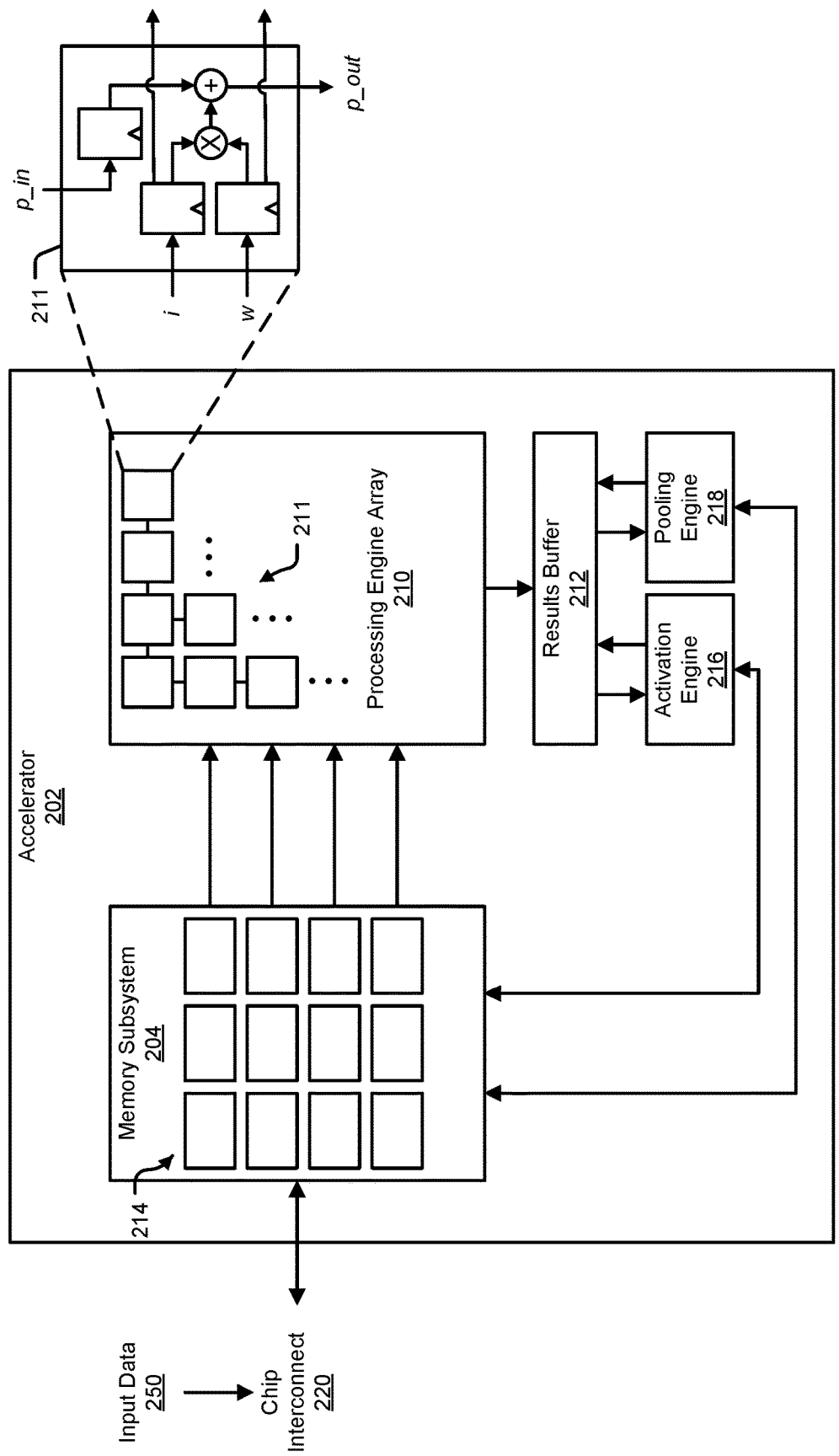
FIG. 2 is a block diagram illustrating an example of an integrated circuit device according to aspects of the present disclosure.

FIG. 2 is a block diagram illustrating an example of an integrated circuit device that can include a processing engine array utilized to remap a tensor to a state buffer according to aspects of the present disclosure. The example of FIG. 2 illustrates an accelerator 202. In various examples, the accelerator 202, for a set of input data (e.g., input data 250), can execute computations using a processing engine array 210, an activation engine 216, and/or a pooling engine 218. In some examples, the example accelerator 202 may be an integrated circuit component of a processor, such as a neural network processor. The processor may have other integrated circuit components, including additional accelerator engines.

In various implementations, the memory subsystem 204 can include multiple memory banks 214. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, values can be simultaneously read and provided to each row of the processing engine array 210, so that the entire processing engine array 210 can be in use in one clock cycle. As another example, the memory banks 214 can be read at the same time that results computed by the processing engine array 210 are written to the memory subsystem 204. In contrast, a single memory may be able to service only one read or write at a time. With a single memory, multiple clock cycles can be required, for example, to read input data for each row of the processing engine array 210 before the processing engine array 210 can be started.

In various implementations, the memory subsystem 204 can be configured to simultaneously service multiple clients, including the processing engine array 210, the activation engine 216, the pooling engine 218, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In some cases, each column of the processing engine array 210 can output a result, such that each column can count as a separate write client. In some cases, output from the processing engine array 210 can be written into the memory banks 214 that can then subsequently provide input data for the processing engine array 210. As another example, the activation engine 216 and the pooling engine 218 can include multiple execution channels, each of which can be separate memory clients. The memory banks 214 can be implemented, for example, using static random access memory (SRAM).

In various implementations, the memory subsystem 204 can include control logic. The control logic can, for example, keep track of the address spaces of each of the memory banks 214, identify memory banks 214 to read from or write to, and/or move data between the memory banks 214. In some implementations, memory banks 214 can be hardwired to particular clients. For example, a set of memory banks 214 can be hardwired to provide values to the rows of the processing engine array 210, with one memory bank servicing each row. As another example, a set of memory banks can be hard wired to receive values from columns of the processing engine array 210, with one memory bank receiving data for each column.

The processing engine array 210 is the computation matrix of the example accelerator 202. The processing engine array 210 can, for example, execute parallel integration, convolution, correlation, and/or matrix multiplication, among other things. The processing engine array 210 includes multiple processing engines 211, arranged in rows and columns, such that results output by one processing engine 211 can be input directly into another processing engine 211. Processing engines 211 that are not on the outside edges of the processing engine array 210 thus can receive data to operate on from other processing engines 211, rather than from the memory subsystem 204.

In various examples, the processing engine array 210 uses systolic execution, in which data arrives at each processing engine 211 from different directions at regular intervals. In some examples, input data can flow into the processing engine array 210 from the left and weight values can be loaded at the top. In some examples weights and input data can flow from the left and partial sums can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 64 columns and 428 rows, or some other number of columns and rows.

An example of a processing engine 211 is illustrated in FIG. 2 in an inset diagram. As illustrated by this example, a processing engine 211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, pin, provided either from another processing engine 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing engine 211. Various other implementations of the processing engine 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214 can be read from the memory subsystem 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the memory subsystem 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include for example, computing a maximum value, a minimum value, an average value, a median value, a summation, a multiplication, or another logical or mathematical combination. In various examples, the pooling engine 218 can include multiple execution channels that can operating on values from corresponding columns of the processing engine array 210. In these examples, the pooling engine 218 may be able to perform between 1 and n parallel computations, where n is equal to the number of columns in the processing engine array 210. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory banks 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the memory subsystem 204, along with input data 250 on which the neural network will operate. The neural network can also include instructions, which can program the processing engine array 210 to perform various computations on the weights and the input data. The instructions can also be stored in the memory subsystem 204, in the memory banks 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the memory subsystem 204 for inputting into the processing engine array 210 to compute results for the next layer of the neural network. The processing engine array 210 can further output final results from a last layer of the neural network. The final results can be stored in the memory subsystem 204 and then be copied out to host processor memory or to another location.

The accelerator 202 can execute computations using a processing engine array, for example, a systolic array. The processing engine array may use systolic execution, in which data arrives at each processing engine of the processing engine array from different directions at regular intervals. For example, referring to FIG. 2, input data may flow into the processing engine array from the left (e.g., over a data bus) and weight values may be loaded from the top (e.g., over a different data bus). The processing engine array may also be referred to herein as a processing element array. The processing element array may have a fixed size, for example, 128 rows by 64 columns of processing elements or an array of another size. The processing element array can perform computations such as matrix multiplications and/or other computations.

The accelerator may also include a memory subsystem on the integrated circuit (also referred to herein as on-chip memory). The on-chip memory may include a buffer memory, for example a state buffer as illustrated in FIG. 2, that stores data. The buffer memory can store data, for example, neural network weights and data to be processed by the processing element array, as well as intermediate and/or final results of computations performed by the processing element array. The buffer memory may have a fixed size, for example 128 rows by 128 columns of memory elements or an array of another size. A partition for the buffer memory may be defined as a row of the buffer memory. Thus, a buffer memory having 128 rows can have 128 partitions, each partition having a number of elements equal to the number of columns in the buffer memory. Each partition is a logical portion of the memory that is independent of other portions of the buffer memory.

For various processing element array computations, data in the form of a tensor may be retrieved from host memory (e.g., dynamic random access memory (DRAM)) and stored in the buffer memory. A tensor is a multidimensional array. A two-dimensional (2D) matrix can be considered a simple tensor, but in general, a tensor may have any number of dimensions. Storing the tensor in the buffer memory of the accelerator reduces latency when the processing element array loads data for performing computations.

In practical applications, the number of data elements in a tensor can be much greater than the number of data elements that can be stored in the buffer memory at one time. In such cases, the compiler may cause the tensor to be decomposed into smaller blocks of data elements having sizes less than or equal to the dimensions of the buffer memory. For example, where the buffer memory has dimensions of p rows by q columns, a tensor having dimensions of m rows by n columns, where m>p and n>q, can be decomposed by the compiler into k blocks of data elements, where the number of blocks, k, is given by equation 1:

$$k=[(m-1)//128+1]\cdot[(n-1)//128+1] \qquad (1)$$

where "//" denotes integer or floor division. The compiler may map each block of data elements of the decomposed tensor to the p partitions (i.e., rows) of the buffer memory with q data elements in each partition.

The number of data elements in a block of a decomposed tensor stored in the buffer memory can be greater than the number of data elements that a processing element array is capable of processing at one time. For example, the buffer memory may have a size of 128 rows by 128 columns while the processing element array may have a size of 128 rows by 64 columns. In such cases, the compiler may further decompose the block of data into two sub-blocks of 128 rows by 64 columns of data. Each sub-block may be separately loaded into and processed by the processing element array.

In some cases, for example when intermediate results of processing element array computations are stored in the buffer memory, there is a need to change the way a tensor is mapped to the buffer memory for use in subsequent calculations. For example, to perform a matrix multiplication it may be necessary to transpose the data elements in one of the matrices. In accordance with aspects of the present disclosure, the speed of the computation process can be increased by using processing element array operations to change the way a tensor (e.g., a matrix) is mapped to the buffer memory. Using the processing array element operations can avoid latency issues that would result from unloading the data from the buffer memory to host memory and then reloading the data to the buffer memory in an appropriately mapped form.

As an example, a 2D tensor (i.e., a matrix) A of shape m rows, n columns may be mapped to the buffer memory having p<m rows and q<n columns. To allow the matrix A to be the left operand of a matrix multiply (e.g., A×B=C), matrix A can be decomposed into k blocks of data elements as described above. Each block can then be mapped to the buffer memory across p partitions with q elements in each partition. In cases where the matrix A needs to be transposed (i.e., $A^T$) to be the left operand of a matrix multiply, each block k can be transposed such that each block is mapped to the buffer memory across q partitions with p elements in each partition. The matrix A may be, for example, results stored back to the buffer memory from a previous computation by the processing element array.

Figure 3:
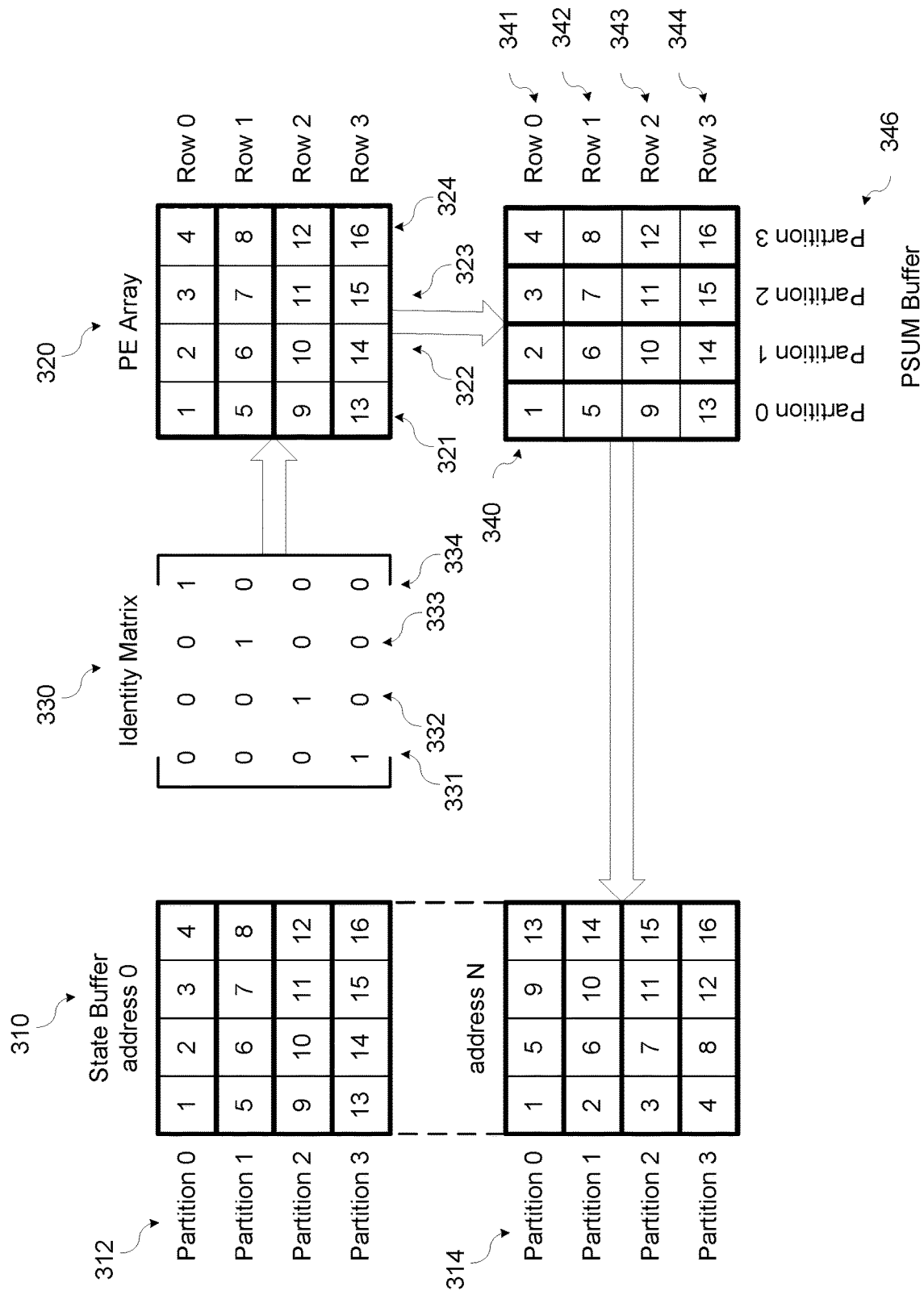
FIG. 3 is a diagram illustrating a simplified example of a process of transposing a matrix using processing element array operations according to aspects of the present disclosure.

FIG. 3 is a diagram illustrating an simplified example of a process of transposing a matrix using processing element array operations according to aspects of the present disclosure. The matrix transpose operation can be performed by an accelerator (e.g., the accelerator 202 in FIG. 2). In FIG. 3, an example using a square matrix is illustrated for ease of explanation, however, the matrix transpose operation is not limited to a square matrix. It should be appreciated that while the present example is explained with a 2D matrix, the 2D matrix can be a block or a sub-block of data elements of a larger decomposed multi-dimensional tensor.

Referring to FIG. 3, data elements of a decomposed tensor forming a 2D matrix A 311 may be mapped to locations in a buffer memory, for example, the state buffer 310. The state buffer 310 may be an on-chip memory for the accelerator. In the example of FIG. 3, the data elements of matrix A 311 may be mapped to partitions 0-3 312 of the state buffer 310. Each partition 312 of the state buffer 310 may be a logical portion of the memory that is independent of other portions. In FIG. 3, each partition 312 of the state buffer 310 may be a row of the state buffer 310 having a number of columns equal to the column dimension of the state buffer 310. Data elements 1, 2, 3, and 4 of matrix A 311 may be mapped to partition 0 starting at a first address (e.g., address 0) of the state buffer 310. Data elements 5-8 of matrix A 311 may be mapped to partition 1 of the state buffer 310, data elements 9-12 of matrix A 311 may be mapped to partition 2 of the state buffer 310, and data elements 13-16 of matrix A 311 may be mapped to partition 3 of the state buffer 310. The data elements of the decomposed tensor stored in the state buffer 310 may be, for example, neural network weights that were results from a previous computation performed by the PE array 320.

The data elements 1-16 of matrix A 311 stored in the state buffer 310 may be loaded into the PE array 320. The PE array 320 is a systolic array and the data elements 1-16 may be loaded as weights into the systolic array. Referring to FIG. 2, the data elements 1-16 may be loaded into the PE array from the top (e.g., over a first data bus). An instruction, for example a load weights instruction, generated by the compiler can cause each of the data elements to be loaded in order into a different processing element in the PE array 320. The data elements from each partition 312 in the state buffer 310 may be loaded into a corresponding row of the PE array 320. For example, the data elements 1-4 in partition 0 of the state buffer 310 may be loaded into row 0 of the PE array 320, the data elements 5-8 in partition 1 of the state buffer 310 may be loaded into row 1 of the PE array 320, the data elements 9-12 in partition 2 of the state buffer 310 may be loaded into row 2 of the PE array 320, and the data elements 13-16 in partition 3 of the state buffer 310 may be loaded into row 3 of the PE array 320. Thus, the data elements 1-16 of matrix A 311 may be loaded into the PE array 320 in the same row-column format as they were stored in the state buffer 310, with the data elements in each row of the PE array 320 corresponding to a partition in the state buffer 310.

After the data elements (e.g., the weights) of matrix A 311 are loaded into the processing elements of the PE array 320, a matrix multiplication operation may be performed by the systolic array using an identity matrix 330. The matrix multiplication operation may perform an element-by-element multiplication of the data elements in a column of the identity matrix and the weights in a column of PE array elements and accumulate (i.e., sum) the results of the multiplications. The identity matrix 330 may also be stored in the state buffer 310. Alternatively, the identity matrix 330 may be constructed by the compiler from a '0' data element and a '1' data element stored in the state buffer 310. The identity matrix 330 may flow into the PE array 320 from the left (e.g., over a second data bus).

It should be noted in the following description that the row-0 341 through row-3 344 are identified for the PSUM buffer 340 only for convenience of explanation. Row-0 341 through row-3 344 identified for the PSUM buffer 340 do not correspond to row partitions in the state buffer 310. As the identity matrix 330 flows into the PE array 320 over the second data bus from the state buffer 310, during the first cycle of the systolic array column-3 334 of the identity matrix 330 will be multiplied by column-0 322 of the PE array 320 and the results of the multiplication summed (i.e., accumulated) in the results buffer (e.g., PSUM buffer) 340. The first element (e.g., weight) in column-0 321 of the PE array 320 will be multiplied by the first element in column-3 334 of the identity matrix 330, the second element in column-0 321 PE array 320 will be multiplied by the second element in column-3 334 of the identity matrix 330, the third element in column-0 321 the PE array 320 will be multiplied by the third element in column-3 334 of the identity matrix 330, the fourth element in column-0 321 PE array 320 will be multiplied by the fourth element in column-3 334 of the identity matrix 330, and the results of the multiplications will be summed in partition-0 at row-0 341 of the PSUM buffer 340. The partitions of the PSUM buffer 340 may be arranged in columns rather than rows as in the state buffer 310. The partitions of the PSUM buffer 340 may correspond to the columns of the systolic array PE array 320. Since the first element in the column 3 334 of the identity matrix 330 is "1" and the remaining elements are "0", the sum of the multiplications stored in row-0 341 of partition-0 in the PSUM buffer 340 will be 1.

During the second cycle of the systolic array column 3 334 of the identity matrix 330 will be multiplied by column-1 322 of the PE array 320, and column-2 333 of the identity matrix will be multiplied by column-0 321 of the PE array 320, and the results of the multiplications may be summed (i.e., accumulated) in the PSUM buffer. The first element in column-1 322 of the PE array 320 will be multiplied by the first element in column-3 334 of the identity matrix 330, the second element in column-1 322 of the PE array 320 will be multiplied by the second element in column-3 334 of the identity matrix 330, the third element in column-1 322 of the PE array 320 will be multiplied by the third element in column-3 334 of the identity matrix 330, the fourth element in column-1 322 PE array 320 will be multiplied by the fourth element in column-3 334 of the identity matrix 330, and the results of the multiplications will be summed in row-0 341 of partition 1 in the PSUM buffer 340. Since the first element in column-3 334 of the identity matrix 330 is "1" and the remaining elements are "0", the sum of the multiplications stored in row-0 341 of partition-1 in the PSUM buffer 340 will be 2.

Similarly, during the second cycle of the systolic array, the first element in column 0 321 of the PE array 320 will be multiplied by the first element in column-2 333 of the identity matrix 330, the second element in column-0 321 of the PE array 320 will be multiplied by the second element in column-2 333 of the identity matrix 330, the third element in column-0 321 of the PE array 320 will be multiplied by the third element in column-2 333 of the identity matrix 330, the fourth element in column-0 321 of the PE array 320 will be multiplied by the fourth element in column-2 333 of the identity matrix 330, and the results of the multiplications will be summed in row-1 342 of partition 0 in the PSUM buffer 340. Since the second element in column-2 333 of the identity matrix 330 is "1" and the remaining elements are "0", the sum of the multiplications stored in row-1 342 of partition-0 in the PSUM buffer 340 will be 5.

During the third cycle of the systolic array, column-3 334 of the identity matrix 330 will be multiplied by column-2 323 of the PE array 320, column-2 333 of the identity matrix will be multiplied by column-1 322 of the PE array 320, and column-1 332 of the identity matrix 330 will be multiplied by column-0 321 of the PE array 320, and the results of the multiplication may be summed (i.e., accumulated) in the PSUM buffer.

The first element in column-2 323 of the PE array 320 will be multiplied by the first element in column-3 334 of the identity matrix 330, the second element in column-2 323 of the PE array 320 will be multiplied by the second element in column 3 334 of the identity matrix 330, the third element in column-2 323 of the PE array 320 will be multiplied by the third element in column-3 334 of the identity matrix 330, the fourth element in column-2 323 PE array 320 will be multiplied by the fourth element in column-3 334 of the identity matrix 330, and the results of the multiplications will be summed in row-0 341 of partition 2 in the PSUM buffer 340. Since the first element in column-3 334 of the identity matrix 330 is "1" and the remaining elements are "0", the sum of the multiplications stored in row-0 341 of partition 2 in the PSUM buffer 340 will be 3.

Similarly, during the third cycle of the systolic array, the first element in column-1 322 of the PE array 320 will be multiplied by the first element in column-2 333 of the identity matrix 330, the second element in column-1 322 of the PE array 320 will be multiplied by the second element in column-2 333 of the identity matrix 330, the third element in column-1 322 of the PE array 320 will be multiplied by the third element in column-2 333 of the identity matrix 330, the fourth element in column-1 322 of the PE array 320 will be multiplied by the fourth element in column-2 333 of the identity matrix 330, and the results of the multiplications will be summed in row-1 342 of partition-1 in the PSUM buffer 340. Since the second element in column-2 333 of the identity matrix 330 is "1" and the remaining elements are "0", the sum of the multiplications stored in row-1 342 of partition 1 in the PSUM buffer 340 will be 6.

Also, during the third cycle of the systolic array, the first element in column-0 321 of the PE array 320 will be multiplied by the first element in column-1 332 of the identity matrix 330, the second element in column-0 321 of the PE array 320 will be multiplied by the second element in column-1 332 of the identity matrix 330, the third element in column-0 321 of the PE array 320 will be multiplied by the third element in column-1 332 of the identity matrix 330, the fourth element in column-0 321 of the PE array 320 will be multiplied by the fourth element in column-1 332 of the identity matrix 330, and the results of the multiplications will be summed in row-2 343 of partition 0 in the PSUM buffer 340. Since the third element in column-1 332 of the identity matrix 330 is "1" and the remaining elements are "0", the sum of the multiplications stored in row-2 343 of partition-0 in the PSUM buffer 340 will be 9.

During the fourth cycle of the systolic array, column-3 334 of the identity matrix 330 will be multiplied by column-3 324 of the PE array 320, column-2 333 of the identity matrix will be multiplied by column-2 323 of the PE array 320, column-1 332 of the identity matrix 330 will be multiplied by column-1 322 of the PE array 320, column-0 331 of the identity matrix 330 will be multiplied by column-0 321 of the PE array 320, and the results of the multiplications may be summed (i.e., accumulated) in the PSUM buffer.

The first element in column-3 324 of the PE array 320 will be multiplied by the first element in column-3 334 of the identity matrix 330, the second element in column-3 324 of the PE array 320 will be multiplied by the second element in column-3 334 of the identity matrix 330, the third element in column-3 324 of the PE array 320 will be multiplied by the third element in column-3 334 of the identity matrix 330, the fourth element in column-3 324 of the PE array 320 will be multiplied by the fourth element in column-3 334 of the identity matrix 330, and the results of the multiplications will be summed in row-0 341 of partition 3 in the PSUM buffer 340. Since the first element in column-3 334 of the identity matrix 330 is "1" and the remaining elements are "0", the sum of the multiplications stored in row-0 341 of partition-3 in the PSUM buffer 340 will be 4.

Similarly, during the fourth cycle of the systolic array, the first element in column-2 323 of the PE array 320 will be multiplied by the first element in column-2 333 of the identity matrix 330, the second element in column-2 323 of the PE array 320 will be multiplied by the second element in column-2 333 of the identity matrix 330, the third element in column-2 323 of the PE array 320 will be multiplied by the third element in column-2 333 of the identity matrix 330, the fourth element in column-2 323 of the PE array 320 will be multiplied by the fourth element in column-2 333 of the identity matrix 330, and the results of the multiplications will be summed in row-1 342 of partition 2 in the PSUM buffer 340. Since the second element in column-2 333 of the identity matrix 330 is "1" and the remaining elements are "0", the sum of the multiplications stored in row-1 342 of partition-2 in the PSUM buffer 340 will be 7.

Also, during the fourth cycle of the systolic array, the first element in column-1 322 of the PE array 320 will be multiplied by the first element in column-1 332 of the identity matrix 330, the second element in column-1 322 of the PE array 320 will be multiplied by the second element in column-1 332 of the identity matrix 330, the third element in column-1 322 of the PE array 320 will be multiplied by the third element in column-1 332 of the identity matrix 330, the fourth element in column-1 322 of the PE array 320 will be multiplied by the fourth element in column-1 332 of the identity matrix 330, and the results of the multiplications will be summed in row-2 343 of partition 1 in the PSUM buffer 340. Since the third element in column-1 332 of the identity matrix 330 is "1" and the remaining elements are "0", the sum of the multiplications stored in row-2 343 of partition-1 in the PSUM buffer 340 will be 10.

Finally, during the fourth cycle of the systolic array, the first element in column-0 321 of the PE array 320 will be multiplied by the first element in column-0 331 of the identity matrix 330, the second element in column-0 321 of the PE array 320 will be multiplied by the second element in column-0 331 of the identity matrix 330, the third element in column-0 321 of the PE array 320 will be multiplied by the third element in column-0 331 of the identity matrix 330, the fourth element in column-0 321 of the PE array 320 will be multiplied by the fourth element in column-0 331 of the identity matrix 330, and the results of the multiplications will be summed in row 3 344 of partition-0 in the PSUM buffer 340. Since the fourth element in column-0 331 of the identity matrix 330 is "1" and the remaining elements are "0", the sum of the multiplications stored in row-3 344 of partition-0 in the PSUM buffer 340 will be 13.

The process continues with the identity matrix 330 propagating across the PE array 320 with until all of the columns of the identity matrix 330 have been multiplied by all of the columns of data elements (e.g., weights) in the PE array 320 resulting in the values shown in the PSUM buffer 340. The data elements accumulated in the column partitions 0-3 of in the PSUM buffer 340, may be transferred back to the state buffer 310, for example, via the activation engine element 216 in FIG. 2) or pooling engine (element 218 in FIG. 2).

The accelerator hardware configuration enables mapping the data elements from the column partitions 346 in the PSUM buffer 340 to row partitions 314 of the state buffer 310. When the data elements in the PSUM buffer 340 are transferred to the state buffer 310, the data elements in the column partition-0 to column partition-3 346 in the PSUM buffer 340 are mapped into row partition-0 to row partition-3, respectively, 314 at a second address (e.g., address N) of the state buffer 310. Thus, row partition 0 of the state buffer 310 contains data elements 1, 5, 9, and 13 (from column partition 0 of the PSUM buffer 340), row partition-1 of the state buffer 310 contains data elements 2, 6, 10, and 14 (from column partition-1 of the PSUM buffer 340), row partition-2 of the state buffer 310 contains data elements 3, 7, 11, and 15 (from column partition-2 of the PSUM buffer 340), and row partition-3 of the state buffer 310 contains data elements 4, 8, 12, and 16 (from column partition-3 of the PSUM buffer 340). Thus, the matrix A 311 can be remapped into the state buffer 310 as the transpose matrix $A^T$ 314.

Figure 4:
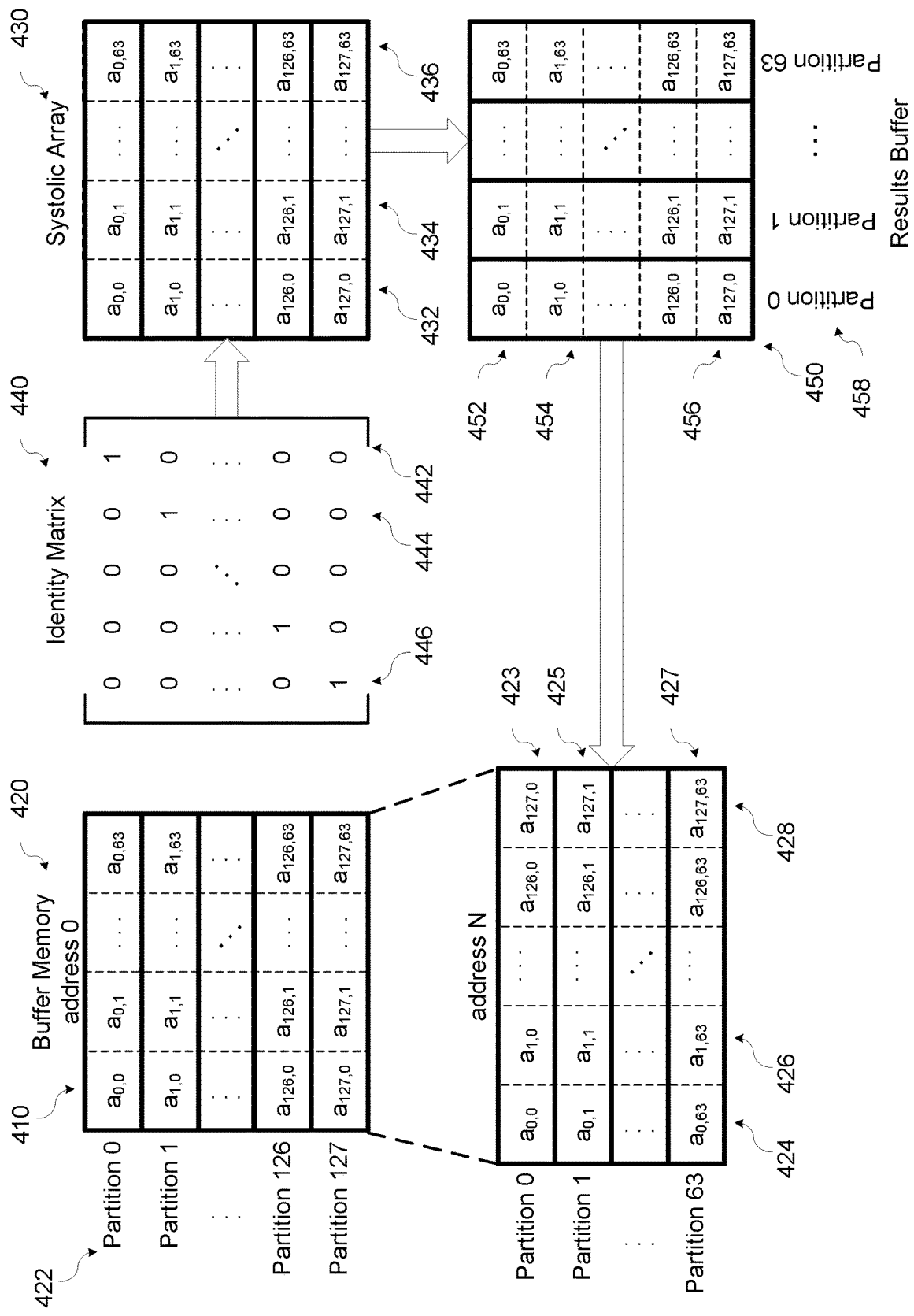
FIG. 4 is a diagram illustrating a generalized example of a tensor transpose operation according to aspects of the present disclosure.

FIG. 4 is a diagram illustrating a generalized example of a tensor transpose operation according to aspects of the present disclosure. In this example, a block of data elements of a decomposed tensor has dimensions of 128 rows by 64 columns and is transposed into a block of data elements having dimensions of 64 rows by 128 columns. In FIG. 4, a block 410 of the decomposed tensor 410 may be stored in an on-chip buffer memory 420 of an accelerator (e.g., accelerator 202 in FIG. 2) beginning at a first memory address (e.g., address 0). The data elements of the decomposed tensor block 410 stored in the buffer memory 420 may be, for example, neural network weights that were results from a previous computation performed by the systolic array 430. The data elements of the decomposed tensor block 410 may be mapped into 128 rows (i.e., 128 partitions 422) of the buffer memory 420 with each row having 64 elements (i.e., 64 columns). Thus, the decomposed tensor block 410 may occupy 128 rows (i.e., rows 0-127) by 64 columns (i.e., columns 0-63) of the buffer memory 420. The size of the decomposed tensor block 410 may correspond to the size of the systolic array 430, in this example 128 rows by 64 columns of processing elements and may be determined by the compiler. The data elements of the decomposed tensor block 410 may be denoted by subscripts indicating the row/column position of the data element as originally stored in the buffer memory 420. For example, as illustrated in FIG. 4, $a_{0,0}$ denotes the data element originally stored in the buffer memory 420 at row 0, column 0 and $a_{127,63}$ denotes the data element originally stored in the buffer memory 420 at row 127, column 63.

The data elements $a_{0,0}$-$a_{127,63}$ of the decomposed tensor block 410 may be loaded into the processing elements of the systolic array 430 over a first data bus (not shown) by a compiler-generated instruction to cause all of the data elements $a_{0,0}$-$a_{127,63}$ of the decomposed tensor block 410 to be loaded in one operation. Each data element $a_{0,0}$-$a_{127,63}$ of the decomposed tensor block 410 may be loaded into a different processing element of the systolic array 430 such that the row/column positions of the data elements $a_{0,0}$-$a_{127,63}$ in the systolic array 430 correspond to the row/column positions of the data elements $a_{0,0}$-$a_{127,63}$ as originally stored in the buffer memory 420. For example, as illustrated in FIG. 4, data element $a_{0,0}$ originally mapped into the buffer memory 420 at row 0 (i.e., partition 0), column 0 is loaded into the processing element at row 0, column 0 of the systolic array 430 and data element $a_{127,63}$ originally mapped into the buffer memory 420 at row 127 (i.e., partition 127), column 63 is loaded into the processing element at row 127, column 63 of the systolic array 430. Thus, the data elements in each row partition 422 of the buffer memory 420 are loaded into corresponding rows of the systolic array 430.

After the instruction to load the data elements into the systolic array 430 completes, the systolic array 430 may begin performing multiply-accumulate operations on the data elements and an identity matrix 440. The identity matrix 440 may be a square matrix having dimensions corresponding to the number of partitions in the buffer memory 420. In this example, the identity matrix 440 may have dimensions of 128 rows by 128 columns since it is a square matrix. The identity matrix 440 may be stored in the buffer memory 420.

The identity matrix 440 may flow into the systolic array 430 one column at a time over a second data bus (not shown) during each processing cycle of the systolic array 430. During each processing cycle, as the identity matrix 440 propagates through the systolic array 430, the data elements (e.g., weights) stored in a column of processing elements of the systolic array 430 are multiplied by a column of elements in the identity matrix 440 and the products are accumulated in the results buffer 450. For example, during a first processing cycle of the systolic array 430, the data elements $a_{0,0}$-$a_{127,0}$ stored in column-0 432 of the systolic array 430 are multiplied element-by-element by the elements in column-127 442 of the identity matrix 440 such that data element $a_{0,0}$ in column-0 432 of the systolic array 430 is multiplied by the first element in column-127 442 of the identity matrix 440 (i.e., $a_{0,0} \times 1 = a_{0,0}$). Similarly, data element $a_{1,0}$ in column-0 432 of the systolic array 430 is multiplied by the second element in column-127 442 of the identity matrix 440 (i.e., $a_{1,0} \times 0 = 0$), and likewise for data elements $a_{2,0}$-$a_{127,63}$ of in column-0 432 of the systolic array 430 and elements 2-127 in column-127 442 of the identity matrix 440. Since all of the elements of column-127 442 of the identity matrix 440 except the first element are zero, when the multiplication products are accumulated (i.e., summed) only data element $a_{0,0}$ will remain. Data element $a_{0,0}$ may be stored in the results buffer 450 at row-0 452 of partition 0. The partitions 458 of the results buffer 450 may be arranged in columns rather than rows as in the buffer memory 420. The partitions 458 of the results buffer 450 may correspond to the columns of the systolic array 430.

The multiply-and-accumulate operations move through the systolic array 430 with each processing cycle. With each cycle of the systolic array 430, the accumulated products are stored in different locations in the results buffer 450. For example, during the second processing cycle of systolic array 430, the data elements in column-1 434 of the systolic array 430 are multiplied by the elements in column 127 442 of the identity matrix 440, and the data elements in column-0 432 of the systolic array 430 are multiplied by the elements in column-126 444 of the identity matrix 440. The accumulated products of the multiplication of column-1 434 of the systolic array 430 and column-127 442 of the identity matrix 440 will yield only data element $a_{0,1}$ since all other products are zero. The accumulated product (i.e., $a_{0,1}$) may be stored in the results buffer 450 at row-0 452 of partition 1.

Similarly, the accumulated products of the multiplication of column-0 432 of the systolic array 430 and column-126 444 of the identity matrix 440 will yield only data element $a_{1,0}$ since all other products are zero. The accumulated product (i.e., $a_{1,0}$) may be stored in the results buffer 450 at row 1 454 of partition 0. As the multiply-accumulate operations move across the systolic array 430 with each processing cycle, the accumulated product for each column of the systolic array 430 performing a multiply-accumulate operation is stored in a subsequent row in the partition corresponding to the particular column of the systolic array 430.

For example, during the first processing cycle of the systolic array 430, the accumulated product $a_{0,0}$ is stored in row-0 of partition-0 of the results buffer 450, during the second processing cycle of the systolic array 430, the accumulated product $a_{1,0}$ is stored in row-1 of partition-0 of the results buffer 450, and so on.

During the last processing cycle of the systolic array 430, the data elements in column-63 436 of the systolic array 430 are multiplied by the elements in column-0 446 of the identity matrix 440. The accumulated products of the multiplication yield only $a_{127,63}$ since all other products are zero, and the accumulated product $a_{127,63}$ is stored in the results buffer 450 at row-127 456 of partition-63. Thus, using the multiply-accumulate operations of the systolic array 430, the data elements of the block 410 of the decomposed tensor 410 loaded into the processing elements of the of the systolic array 430 are transferred to the results buffer 450 in the same row/column arrangement as they were loaded into the systolic array 430, but within partitions arranged in columns rather than rows.

Once the data elements of the block 410 of the decomposed tensor are stored in the column partitions 458 of the results buffer 450, compiler-generated instructions may cause the data elements $a_{0,0}$-$a_{127,63}$ to be transferred back to the buffer memory 420 starting at a second memory address (e.g., address N) via another hardware execution engine, for example a pooling engine or an activation engine, of the accelerator. The hardware of the accelerator can configured such that the column partitions 458 in the results buffer 450 are mapped to row partitions 422 of the buffer memory 420. For example, beginning at address N in the buffer memory 420, data element $a_{0,0}$ of the block 410 of the decomposed tensor may be mapped to column-0 424 of partition-0 423, data element $a_{1,0}$ of the block 410 of the decomposed tensor may be mapped to column-1 426 of partition-0 423, and so forth up to data element $a_{127,0}$ of the block 410 of the decomposed tensor which may be mapped to column-127 428 of partition-0 423 of the buffer memory 420.

Similarly, data element $a_{0,63}$ of the block 410 of the decomposed tensor may be mapped to column-0 424 of partition 63 427, data element $a_{1,63}$ of the block 410 of the decomposed tensor may be mapped to column-1 426 of partition-63 427, and so forth up to data element $a_{127,63}$ of the block 410 of the decomposed tensor which may be mapped to column-127 428 of partition-63 427 of the buffer memory 420. Thus, using the multiply-accumulate operations of the systolic array 430, the block 410 of the decomposed tensor originally mapped to the buffer memory 420 in 128 row partitions having 64 columns can be transposed in the buffer memory 420 to a tensor block mapped to 64 row partitions having 128 columns.

In some implementations, as accumulated products (i.e., data elements of the block 410 of the decomposed tensor) fill a row across all of the column partitions in the results buffer 450, the compiler may generate instructions to map one data element in each column partition to a corresponding row partition in the buffer memory determined by the compiler. In some implementations, after all the accumulated products (i.e., all the data elements of the block 410 of the decomposed tensor) have been stored in the column partitions of the results buffer 450, the compiler may generate instructions to map all the data elements in each column partition of the results buffer 450 to corresponding row partitions in the buffer memory 420 determined by the compiler.

Figure 5:
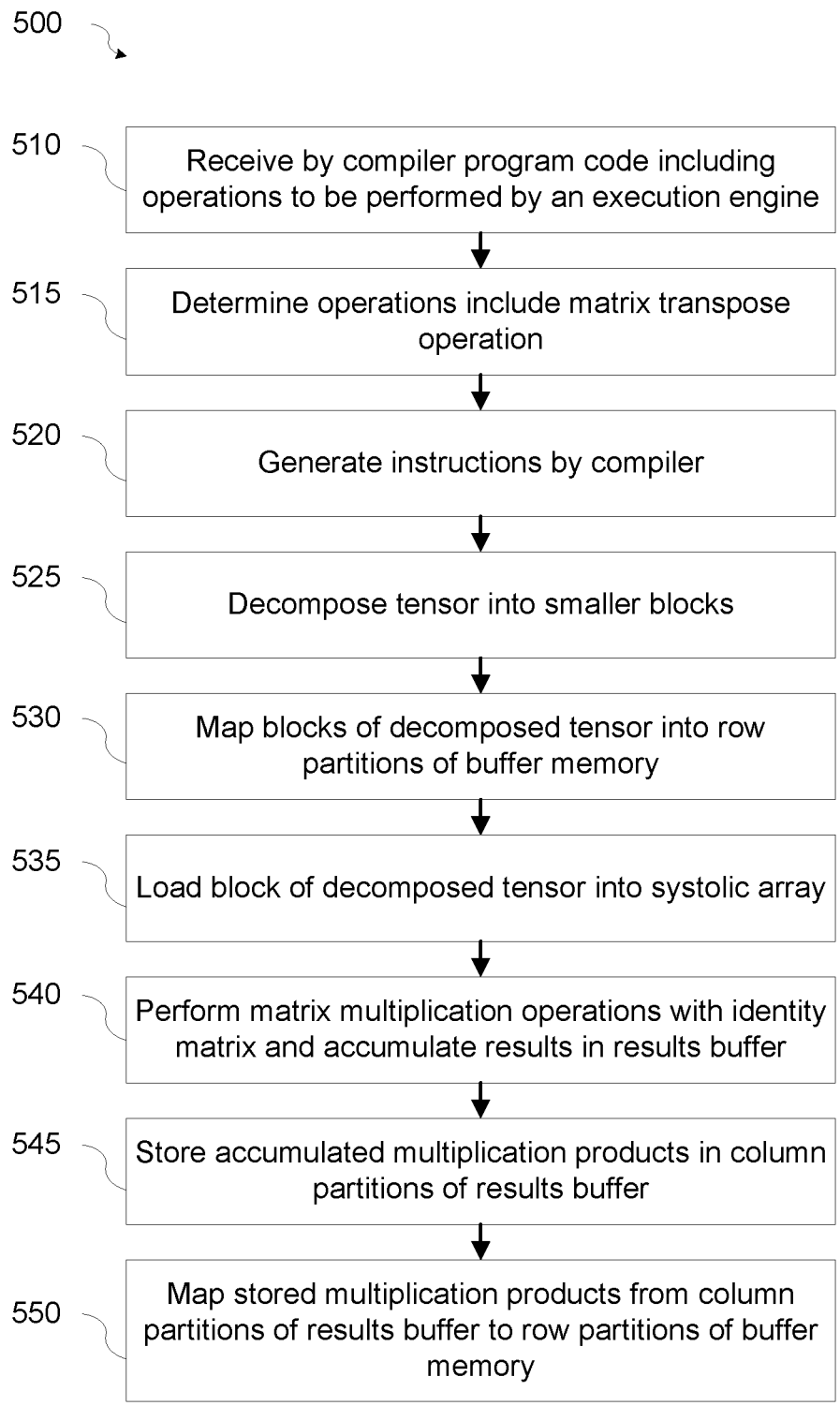
FIG. 5 is a flowchart illustrating an example of a method for performing a transpose operation on a block of a decomposed tensor according to aspects of the present disclosure.

FIG. 5 is a flowchart illustrating an example of a method 500 for performing a transpose operation on a block of a decomposed tensor according to aspects of the present disclosure. These methods may be implemented by the systems described above, such as for example the compiler illustrated in FIG. 1 and the accelerator illustrated in FIG. 2.

Referring to FIG. 5, at block 510, a compiler may receive program code to cause an execution engine to perform a set of operations. For example, the program code may cause various elements (e.g., a systolic array, a buffer memory, a results buffer, etc.) of the execution engine to perform data processing operations.

At block 515, it may be determined that the data processing operations include a matrix transpose operation. In some implementations, in order to perform the matrix transpose operation, a multi-dimensional tensor may need to be decomposed into smaller blocks of data elements having dimensions compatible with the dimensions of a buffer memory of the execution engine.

At block 520, the compiler may generate instructions for causing the execution engine to perform the data processing operations. For example, the compiler may generate a set of instructions to decompose the multi-dimensional tensor into blocks of data elements compatible with the dimensions of a buffer memory, and to cause the execution engine (i.e., accelerator) to perform the matrix transpose operations on the blocks of the decomposed multi-dimensional tensor. The compiler may also generate instructions to implement the matrix transpose operations using identity matrix multiplications.

Starting at block 525, the instructions generated by the compiler can be executed. The multi-dimensional tensor may be decomposed into smaller blocks of data elements. The tensor may be a multi-dimensional tensor initially stored in host memory (e.g., DRAM). In practical applications, the number of data elements in a tensor can be much greater than the number of data elements that can be stored in a buffer memory of an integrated circuit for example, an accelerator, at one time. The compiler may generate instructions to decompose the tensor into smaller blocks of a size compatible with the buffer memory. For example, where the buffer memory has dimensions of p rows by q columns, a tensor having dimensions of m rows by n columns, where m>p and n>q, can be decomposed by compiler-generated instructions into k blocks, where the number of blocks, k, is given by equation 1 above. In some case, the blocks of data elements may be results of previous computations stored in the buffer memory.

At block 530, one or more blocks of the decomposed tensor may be mapped into row partitions of buffer memory. The buffer memory may be configured with partitions corresponding to rows of storage in the buffer memory. Each partition is a logical portion of the memory that is independent of other portions of the buffer memory. For example, the buffer memory may have dimensions of 128 rows by 128 columns. Each row of the buffer memory may be a partition, and each partition may include 128 columns. A block of the decomposed tensor having the same or smaller dimensions may be mapped into the buffer memory.

At block 535, a block of the decomposed tensor may be loaded from the buffer memory into the systolic array. In some cases, the number of data elements in a block of a decomposed tensor stored in the buffer memory can be greater than the number of data elements that a processing element array is capable of processing at one time. For example, the buffer memory may have a size of 128 rows by 128 columns while the processing element array may have a size of 128 rows by 64 columns. In such cases, the compiler may generate instructions to further decompose the block of data into two sub-blocks of 128 rows by 64 columns of data.

The data elements of the decomposed tensor block or sub-block may be loaded into the processing elements of the systolic array over a first data bus by a compiler-generated instruction to cause all of the data elements of the decomposed tensor block to be loaded in one operation. Each data element of the decomposed tensor block may be loaded into a different processing element of the systolic array such that the row/column positions of the data elements in the systolic array correspond to the row/column positions of the data elements as originally stored in the buffer memory. Thus, the data elements in each row (i.e., partition) of the buffer memory may be loaded into corresponding rows of the systolic array.

At block 540, matrix multiplication operations with an identity matrix may be performed and the multiplication products accumulated in the results buffer. For each processing cycle, as the identity matrix flows into the systolic array on a second data bus, the systolic array may perform a multiplication between one or more columns of the identity matrix and one or more columns of the data elements stored in the processing elements of the systolic array. Since each column of the identity matrix contains a "1" in only one position and zeros in all the other positions, the column multiplication can possibly yield only one non-zero product which is the data element corresponding to the position of the "1" in the column of the identity matrix.

At block 545, the accumulated multiplication products are stored in column partitions of results buffer. The partitions of the results buffer may be arranged in columns rather than rows as in the buffer memory. Each column partition of the results buffer may correspond to a column of the systolic array. As the multiply-accumulate operations move across the systolic array with each processing cycle, the accumulated product for each column of the systolic array performing a multiply-accumulate operation is stored in a subsequent row in the partition corresponding to the particular column of the systolic array.

For example, referring to FIG. 4, during the first processing cycle of the systolic array, the accumulated product of column 0 of the data elements in the systolic array multiplied by column 127 of the identity matrix may be data element $a_{0,0}$. Data element $a_{0,0}$ may be stored in row-0 of partition-0 in the results buffer. During the second processing cycle of systolic array, the data elements in column-1 of the systolic array are multiplied by the elements in column-127 of the identity matrix, and the data elements in column-0 of the systolic array are multiplied by the elements in column-126 of the identity matrix. The accumulated products of the multiplication of column-1 of the systolic array and column-127 of the identity matrix will yield only data element $a_{0,1}$ since all other products are zero. The accumulated product (i.e., $a_{0,1}$) may be stored in the results buffer at row-0 of partition-1. The accumulated products of the multiplication of column-0 of the systolic array and column 126 of the identity matrix will yield only data element $a_{1,0}$ since all other products are zero. The accumulated product (i.e., $a_{1,0}$) may be stored in the results buffer at row-1 of partition-0. The process may continue until all the columns of the identity matrix have propagated through and been multiplied by all the columns of data elements in the systolic array. Using the multiply-accumulate operations of the systolic array, the data elements of the block of the decomposed tensor loaded into the processing elements of the of the systolic array are transferred to the results buffer in the same row/column arrangement as they were loaded into the systolic array, but within partitions arranged in columns rather than rows.

Returning to FIG. 5, at block 550, the stored multiplication products from column partitions of results buffer may be mapped to the row partitions of buffer memory. Once the data elements of the block of the decomposed tensor are stored in the column partitions of the results buffer, compiler-generated instructions may cause the data elements to be mapped back to the buffer memory starting at a second memory address (e.g., address N) via another hardware execution engine, for example a pooling engine or an activation engine, of the accelerator. The hardware of the accelerator can be configured such that the column partitions in the results buffer are transposed to row partitions of the buffer memory. Thus, the block of the decomposed tensor originally stored in the buffer memory in 128 row partitions having 64 columns can be transposed in the buffer memory to a tensor block having 64 row partitions having 128 columns using the multiply-accumulate operations of the systolic array.

In some implementations, as each partition in the results buffer becomes full, i.e., data elements occupy all of the rows in a column partition, the compiler may generate instructions to map the data elements in the column partition to a row partition in the buffer memory determined by the compiler. By implementing the matrix transpose operation using an identity matrix multiplication operation within the execution engine as described above, the matrix transpose operation can be performed without having to write data into a host memory (e.g., DRAM) and read back the data from the host memory. In other words, using the technique described above, the host memory can be bypassed when performing a matrix transpose operation. As a result, the computational time to perform the matric transpose operation can be reduced as compared to implementations that require using the host memory. Furthermore, the matrix transpose operation can be performed within the execution engine to free up processing cycles for the host processor.

It should be appreciated that the specific steps illustrated in FIG. 5 provide a particular method for performing a transpose operation on a block of a decomposed tensor according to an embodiment. Other sequences of steps may also be performed according to alternative embodiments. For example, alternative embodiments may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

The method for performing a transpose operation on a block of a decomposed tensor may be embodied on a non-transitory computer readable medium known to those of skill in the art, having stored therein a program including computer executable instructions for making a processor, computer, or other programmable device execute the operations of the methods.

Figure 6:
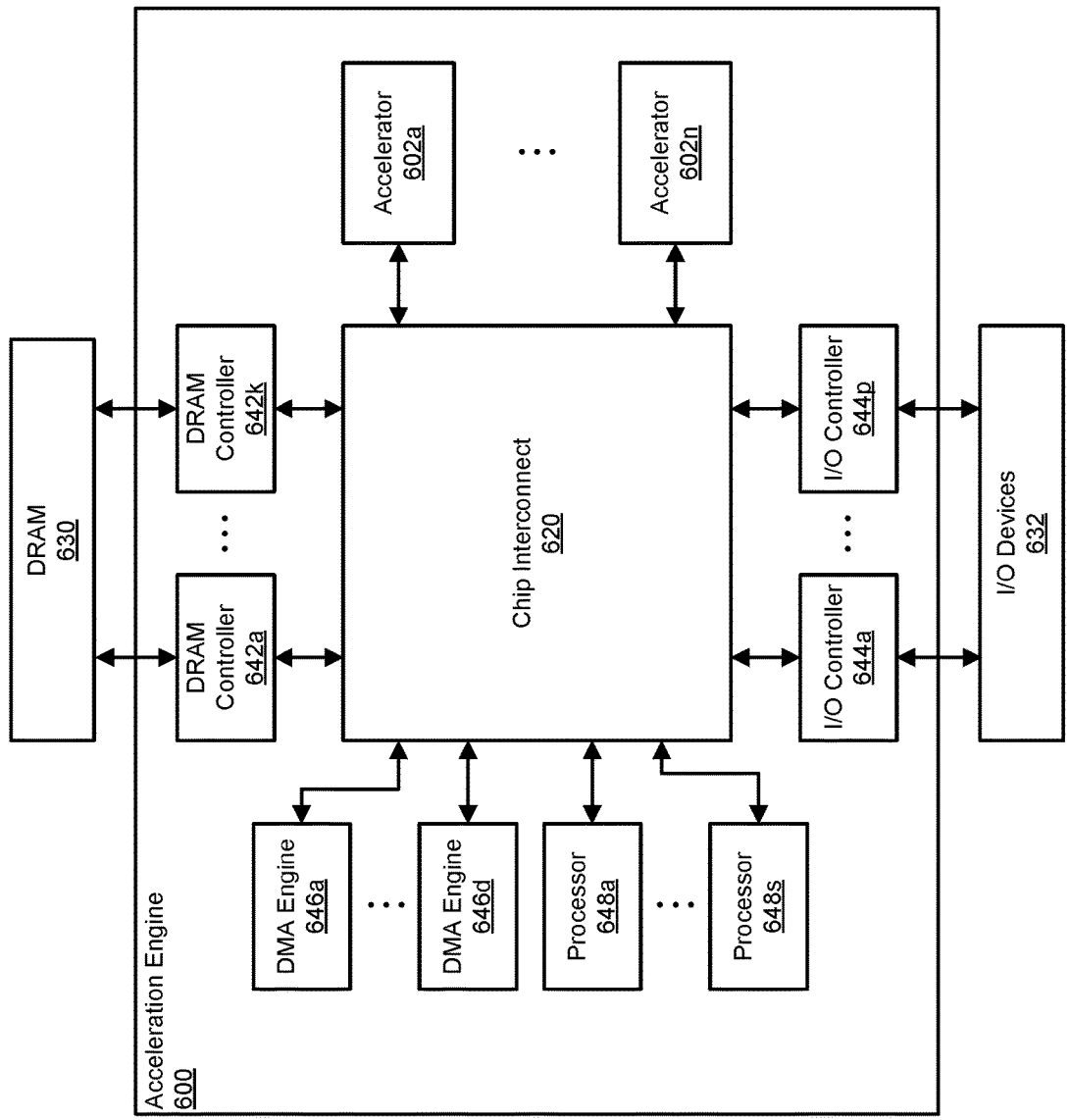
FIG. 6 includes a block diagram that illustrates an example of an acceleration engine according to aspects of the present disclosure.

FIG. 6 includes a block diagram that illustrates an example of an acceleration engine 600 according to aspects of the present disclosure. The acceleration engine 600 is an example of an integrated circuit that can include one or more accelerators 602a-602n that may be similar to the accelerator illustrated in FIG. 2.

In the example of FIG. 6, the acceleration engine 600 includes multiple accelerators 602a-602n, each of which can perform a set of operations. In various examples, the accelerators 602a-602n are for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of the is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations. In various examples, the processors 648a-648s can manage moving of program code from the DRAM 630 to the accelerators 602a-602n.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into the device (e.g., on the same silicon die). In other examples, the processors 648a-648s can be external to the acceleration engine 600 (e.g., on a different die and/or in a different package). In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d are determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
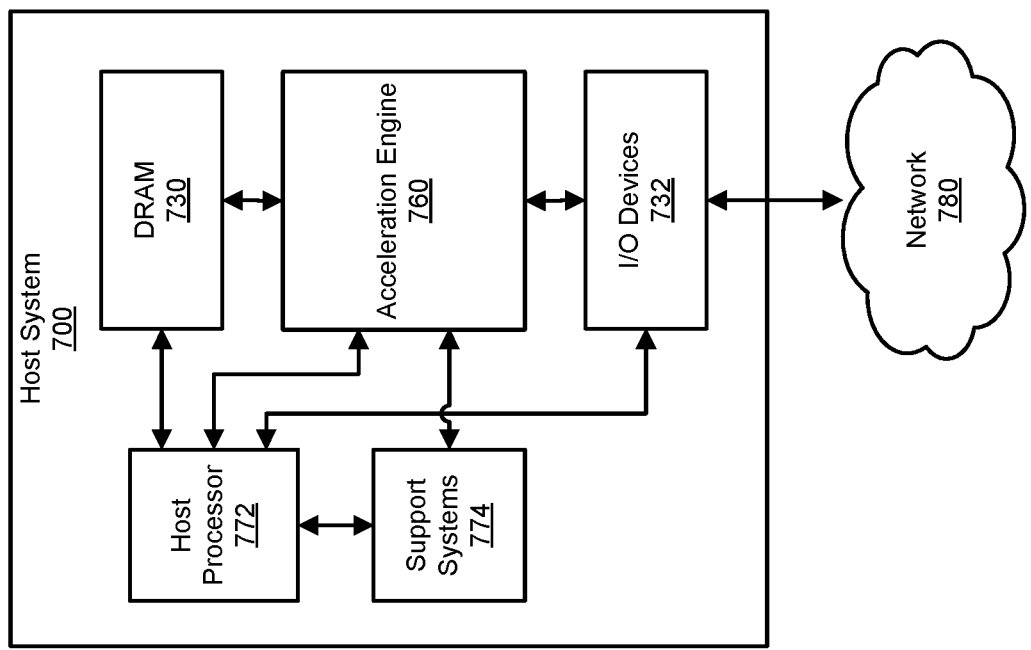
FIG. 7 includes a block diagram that illustrates an example of a host system according to aspects of the present disclosure.

FIG. 7 includes a block diagram that illustrates an example of a host system 700 in which an acceleration engine 760 can be used according to aspects of the present disclosure. The acceleration engine 760 of FIG. 7 is an example of a device that can include one or more accelerators such as is illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 8:
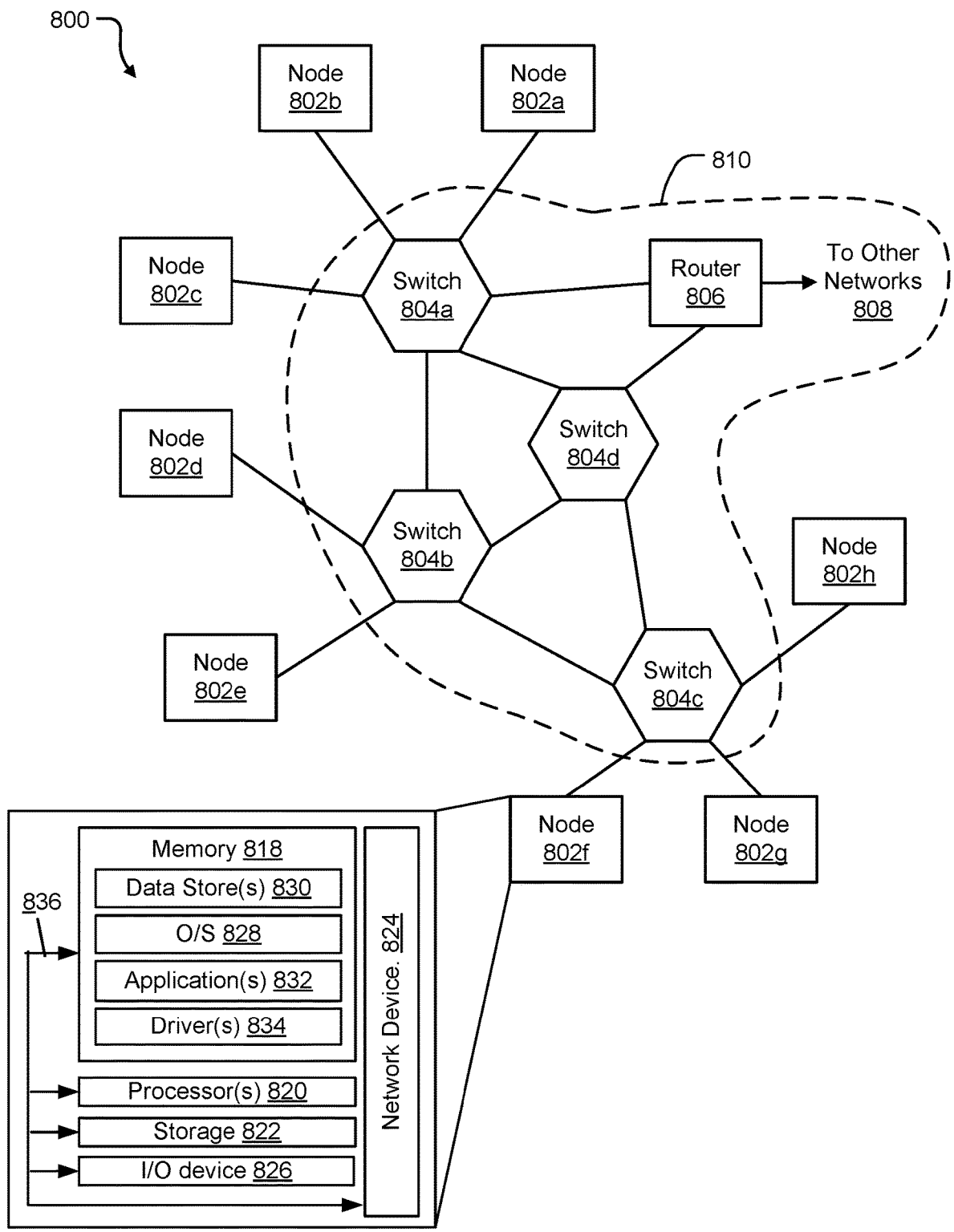
FIG. 8 includes a diagram of an example network according to aspects of the present disclosure.

FIG. 8 includes a diagram of an example network 800, which can include one or more host systems, such as the host system illustrated in FIG. 7 according to aspects of the present disclosure. For example, the example network 800 of FIG. 8 includes multiple nodes 802*a*-802*h*, one or more of which can be a host system such as is illustrated in FIG. 7. Others of the nodes 802*a*-802*h* can be other computing devices, each of which include at least a memory for storing program instructions, a processor for executing the instructions, and a network interface for connecting to the network 800.

In various examples, the network 800 can be used to process data. For example, input data can be received at one of the nodes 802*a*-802*h* or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802*a*-802*h* and/or computing devices located in the other networks 808, and the accumulated input data can be directed to one or more host systems in the network 800. Results from the host systems can then be distributed back to the sources from which the input data was gathered.

In various examples, one or more of the nodes 802*a*-802*h* can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802*a*-802*h* are connected to one another using a switched architecture with point-to point links. The switched architecture includes multiple switches 804*a*-804*d*, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804*a*-804*d* of FIG. 8 may be connected to the nodes 802*a*-802*h* and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804*a*-804*d* and the router 806, if present, may be referred to as a switch fabric 810, a fabric, a network fabric, or simply a network. In the context of a computer network, terms "fabric" and "network" may be used interchangeably herein.

The nodes 802*a*-802*h* may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802*a*-802*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802*a*-802*h* may also include I/O device(s) 826, such as a keyboard, a mouse, a pen, a voice input device, a touch input device, a display, speakers, a printer, and the like. The node(s) 802*a*-802*h* may also include one or more communication channels 836. A communication channel 836 may provide a medium over which the various components of the node(s) 802*a*-802*h* can communicate. The communication channel or channels 836 may take the form of a bus, a ring, a switching fabric, or a network.

The node(s) 802*a*-802*h* may also contain network device(s) 824 that allow the node(s) 802*a*-802*h* to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for transposing a tensor using processing element array operations, the method comprising:
   mapping a block of data elements of the tensor to a number of row partitions of a state buffer of an integrated circuit, each row partition having a number of columns;
   loading the data elements into a processing element array of the integrated circuit in corresponding rows and columns of processing elements;
   performing a series of multiplication operations with an identity matrix such that each column of the identity matrix is sequentially multiplied by each column of data elements in the processing element array;
   after each multiplication operation, summing multiplication products for each column of the processing element array that performs a multiplication operation with a column of the identity matrix;
   storing, in a corresponding column partition of a results buffer, the summed multiplication products for each column of the processing element array that performs a multiplication operation, the results buffer having a same number of column partitions as columns in the processing element array, wherein the summed multiplication products for subsequent multiplication operations are stored in subsequent rows for each corresponding column partition, and wherein the results buffer has a same number of rows as the processing element array; and
   loading the summed multiplication products stored in the column partitions in the results buffer to a corresponding number of row partitions in the state buffer.

2. The method of claim 1, further comprising decomposing the tensor into multiple blocks of data elements, each block of data elements having a size that corresponds to a size of the state buffer.

3. The method of claim 1, wherein each summed multiplication product stored in the results buffer corresponds to one of the data elements stored in the processing element array.

4. The method of claim 1, wherein summing the multiplication products in the column partitions of the results buffer reproduces the block of data elements of the tensor in same row and column positions in the results buffer as the block of data elements was loaded into the processing element array.

5. A computer-implemented method, comprising:
   receiving, by a compiler, a set of operations to be performed by an execution engine;
   determining, by the compiler, that the set of operations includes performing a matrix transpose operation on a tensor;
   converting, by the compiler, the matrix transpose operation into an identity matrix multiplication operation; and
   generating, by the compiler, a set of instructions operable to transpose the tensor by loading data elements of the tensor from a buffer memory of the execution engine into a systolic array of the execution engine, performing an identity multiplication on the data elements in the systolic array, storing a result of the identity multiplication in a results buffer of the execution engine, and loading the result from the results buffer into the buffer memory.

6. The computer-implemented method of claim 5, wherein loading the data elements of the tensor comprises loading the data elements into the systolic array over a first data bus in response to a first instruction of the set of instructions.

7. The computer-implemented method of claim 5, wherein performing the identity multiplication comprises propagating, by a second instruction of the set of instructions, columns of an identity matrix from the buffer memory into the systolic array over a second data bus one column at a time during each processing cycle of the systolic array.

8. The computer-implemented method of claim 5, wherein the results buffer comprises a set of column partitions, and each column partition in the results buffer corresponds to a column of processing elements in the systolic array.

9. The computer-implemented method of claim 8, wherein:
   the buffer memory comprises a set of row partitions, and
   a first instruction in the set of instructions maps each column partition in the results buffer to a row partition of the buffer memory.

10. The computer-implemented method of claim 5, wherein the identity multiplication comprises multiplying data elements of the tensor stored in each column of a set of columns of processing elements of the systolic array by each column of an identity matrix, and
    wherein the multiplication of a column of data elements of the tensor with a column of the identity matrix generates at most one non-zero value.

11. The computer-implemented method of claim 10, wherein the storing the result of the identity multiplication in the results buffer comprises summing multiplication products from each column multiplication performed by the systolic array, and
    wherein each summed multiplication product has a value equal to a data element of the tensor corresponding to a non-zero element in the column of the identity matrix.

12. The computer-implemented method of claim 5, wherein storing the result of the identity multiplication in the results buffer reproduces the data elements of the tensor in same row and column positions in the results buffer as the data elements were loaded into the execution engine.

13. The computer-implemented method of claim 5, further comprising:
   prior to transposing the tensor, decomposing, by the set of instructions generated by the compiler, the tensor into blocks of data elements of the tensor having dimensions not exceeding dimensions of the buffer memory; and
   storing a block of data elements in the buffer memory.

14. The computer-implemented method of claim 13, wherein the computer-implemented method further comprises:
   decomposing, by the set of instructions generated by the compiler, the blocks of data elements of the tensor stored in the buffer memory into sub-blocks of data elements having dimensions not exceeding dimensions of the systolic array; and
   loading a sub-block of data elements into the systolic array.

15. The computer-implemented method of claim 14, wherein:
   the buffer memory comprises a set of rows,
   each row of the buffer memory comprises a partition,
   the data elements of the tensor in the sub-block are mapped to the partitions in the buffer memory, and
   the data elements stored in each partition in the buffer memory are loaded into corresponding rows in the systolic array.

16. The computer-implemented method of claim 5, wherein the data elements of the tensor are intermediate results of computations performed by the execution engine.

17. A non-transitory computer readable medium having stored therein instructions that, when executed by one or more processors cause the one or more processors to execute a compiler, the compiler performing operations including:
   receiving a set of operations to be performed by an execution engine;
   determining that the set of operations includes performing a matrix transpose operation on a tensor;
   converting the matrix transpose operation into an identity matrix multiplication operation; and
   generating a set of instructions operable to transpose the tensor by loading data elements of the tensor from a buffer memory of the execution engine into a systolic array of the execution engine, performing an identity multiplication on the data elements in the systolic array, storing a result of the identity multiplication in a results buffer of the execution engine, and loading the result from the results buffer into the buffer memory.

18. The non-transitory computer-readable medium of claim 17, wherein the results buffer comprises a set of column partitions, and each column partition in the results buffer corresponds to a column of processing elements in the systolic array;
   the buffer memory comprises a set of row partitions, and
   a first instruction in the set of instructions maps each column partition in the results buffer to a row partition of the buffer memory.

19. The non-transitory computer-readable medium of claim 17, further including instructions that, when executed by the one or more processors cause the compiler to perform operations including:
   prior to transposing the tensor, decomposing the tensor into blocks of data elements of the tensor having dimensions not exceeding dimensions of the buffer memory; and
   storing a block of data elements in the buffer memory.

20. The non-transitory computer-readable medium of claim 19, further including instructions that, when executed by the one or more processors cause the compiler to perform operations including:
   decomposing the blocks of data elements of the tensor stored in the buffer memory into sub-blocks of data elements having dimensions not exceeding dimensions of the systolic array; and
   loading a sub-block of data elements into the systolic array.

\* \* \* \* \*